(12) United States Patent
Arai et al.

(10) Patent No.: US 10,417,511 B2
(45) Date of Patent: Sep. 17, 2019

(54) IMAGE PROCESSOR, DETECTION APPARATUS, LEARNING APPARATUS, IMAGE PROCESSING METHOD, AND COMPUTER PROGRAM STORAGE MEDIUM

(71) Applicant: Panasonic Intellectual Property Management Co., Ltd., Osaka (JP)

(72) Inventors: Yuko Arai, Tokyo (JP); Koji Arata, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 94 days.

(21) Appl. No.: 15/713,604

(22) Filed: Sep. 23, 2017

(65) Prior Publication Data
US 2018/0101741 A1    Apr. 12, 2018

(30) Foreign Application Priority Data

Oct. 7, 2016   (JP) ................................. 2016-199340

(51) Int. Cl.
*G06K 9/00* (2006.01)
*G06T 7/73* (2017.01)
(Continued)

(52) U.S. Cl.
CPC ..... *G06K 9/00838* (2013.01); *G06K 9/00382* (2013.01); *G06T 7/344* (2017.01); *G06T 7/35* (2017.01); *G06T 7/75* (2017.01); *B60Y 2400/3015* (2013.01); *G06K 9/42* (2013.01); *G06K 9/6226* (2013.01); *G06K 9/6255* (2013.01); *G06T 2207/20076* (2013.01); *G06T 2207/20081* (2013.01);
(Continued)

(58) Field of Classification Search
CPC .. G06K 9/00838; G06K 9/00382; G06K 9/42; G06K 9/6255; G06K 9/6226; G06T 7/35; G06T 7/344; G06T 7/75; G06T 2207/20076; G06T 2207/20081; G06T 2207/30196; G06T 2207/30268; H04N 5/225; B60Y 2400/3015
See application file for complete search history.

(56) References Cited

U.S. PATENT DOCUMENTS

2005/0196035 A1*  9/2005  Luo .................... G06K 9/00369
                                                              382/159
2007/0176402 A1   8/2007  Irie et al.
(Continued)

FOREIGN PATENT DOCUMENTS

JP        2007-198929        8/2007

*Primary Examiner* — Jon Chang
(74) *Attorney, Agent, or Firm* — Greenblum & Bernstein, P.L.C.

(57) ABSTRACT

An image processor includes an image converter. The image converter transforms data of an image that is photographed with a camera for photographing a seat, based on a transformation parameter that is calculated in accordance with a camera-position at which the camera is disposed. The image converter outputs the thus-transformed data of the image. The transformation parameter is a parameter for transforming the data of the image such that an appearance of the seat depicted in the image is approximated to a predetermined appearance of the seat.

16 Claims, 14 Drawing Sheets

(51) Int. Cl.
    *G06T 7/33*     (2017.01)
    *G06T 7/35*     (2017.01)
    *G06K 9/62*     (2006.01)
    *G06K 9/42*     (2006.01)
    *H04N 5/225*     (2006.01)

(52) U.S. Cl.
    CPC ............... *G06T 2207/30196* (2013.01); *G06T 2207/30268* (2013.01); *H04N 5/225* (2013.01)

(56) References Cited

U.S. PATENT DOCUMENTS

| | | | |
|---|---|---|---|
| 2013/0129152 A1* | 5/2013 | Rodriguez Serrano | G06K 9/6255 382/105 |
| 2017/0214899 A1* | 7/2017 | Meier | G06T 19/006 |
| 2017/0316285 A1* | 11/2017 | Ahmed | G06K 9/66 |
| 2018/0232639 A1* | 8/2018 | Lin | G06N 3/063 |

\* cited by examiner

FIG. 9

|  | a | | b | | c | | d | |
|---|---|---|---|---|---|---|---|---|
|  | x | y | x | y | x | y | x | y |
| Image 31 | 126 | 131 | 265 | 100 | 269 | 351 | 162 | 325 |
| Image 32 | 145 | 136 | 266 | 93 | 285 | 336 | 189 | 320 |
| Image 33 | 189 | 129 | 290 | 111 | 293 | 349 | 197 | 330 |
| Reference Coordinate | 159 | 140 | 268 | 115 | 282 | 345 | 184 | 324 |

IMAGE PROCESSOR, DETECTION APPARATUS, LEARNING APPARATUS, IMAGE PROCESSING METHOD, AND COMPUTER PROGRAM STORAGE MEDIUM

BACKGROUND

1. Technical Field

The present disclosure relates to image processors, detection apparatuses, learning apparatuses, methods of processing images, and storage media which store image processing programs; they are intended to be used for learning and detecting predetermined states.

2. Description of the Related Art

In recent years, technologies have been developed each for detecting the state of an occupant of a movable body (a vehicle such as an automobile, for example). For example, Japanese Patent Unexamined Publication No. 2007-198929 discloses a system which improves detection accuracy in detecting the state of an occupant.

In the system, a camera is used which is set at a position from which a seat in the interior of the vehicle can be photographed. Based on data of the distance from the camera, the size of a head template (a pattern which expresses the head of a person) prepared in advance is normalized. Next, matching is performed between an image photographed by the camera and the thus-normalized head template, thereby calculating a correlation value. If the thus-calculated correlation value is not smaller than a threshold value, the system determines that the occupant is being seated.

SUMMARY

The present disclosure is intended to provide an image processor, a detection apparatus, a learning apparatus, a method of processing an image, and a storage medium which stores an image processing program, each of which allows low-cost, high-accuracy detection of the state of an occupant.

The image processor according to the present disclosure includes an image converter. The image converter transforms data of an image that is photographed with a camera for photographing a seat, on the basis of a transformation parameter that is calculated in accordance with a camera-position at which the camera is disposed. The image converter outputs the thus-transformed data of the image. The transformation parameter is a parameter that is used to transform the data of the image such that an appearance of the seat depicted in the image is approximated to a predetermined appearance of the seat.

The detection apparatus according to the present disclosure includes the image processor described above, and a detector. The detector detects a predetermined state depicted in the image based on both a learning model and feature amounts which is extracted from the transformed data that are outputs from the converter included in the image processor.

The learning apparatus according to the present disclosure includes the image processor described above, and a learning unit. The image converter included in the image processor acquires both data of a correct image that indicates a first state of a seat and data of an incorrect image that indicates a second state of the same seat where the correct and incorrect images are photographed with the camera. Then, the image converter transforms both the data of the correct image and the data of the incorrect image based on the transformation parameter. Moreover, the image converter outputs both the thus-transformed data of the correct image and the thus-transformed data of the incorrect image, to the learning unit. The learning unit extracts the feature amounts from both the thus-transformed data of the correct image and the thus-transformed data of the incorrect image output from the image converter. Then, the learning unit creates the learning model based on the thus-extracted feature amounts.

In the method of processing an image according to the present disclosure, data of an image photographed with a camera for photographing a seat are acquired. Then, the data of the image photographed with the camera are transformed, based on a transformation parameter that is calculated in accordance with a camera-position at which the camera is disposed. Moreover, the thus-transformed data of the image are output. The transformation parameter is a parameter that is used to transform the data of the image such that an appearance of the seat depicted in the image is approximated to a predetermined appearance of the seat.

The storage medium according to the present disclosure is a nonvolatile storage medium which stores an image processing program causing a computer to execute. Such an image processing program includes: acquiring data of an image that is photographed with a camera for photographing a seat; transforming the data of the image based on a transformation parameter that is calculated in accordance with a camera-position at which the camera is disposed; and outputting the thus-transformed data of the image. The transformation parameter is a parameter that is used to transform the data of the image described above such that an appearance of the seat depicted in the image is approximated to a predetermined appearance of the seat.

BRIEF DESCRIPTION OF THE DRAWINGS

FIG. 9 is a table of an example of calculated coordinates and reference coordinates.

DETAILED DESCRIPTION OF PREFERRED EMBODIMENTS

Prior to descriptions of embodiments of the present disclosure, problems of conventional technologies will be described. With conventional technologies, they entail a large amount of costs to acquire distance data that are necessary for normalizing sizes of head templates. This will be described in detail below.

Figure 1A:
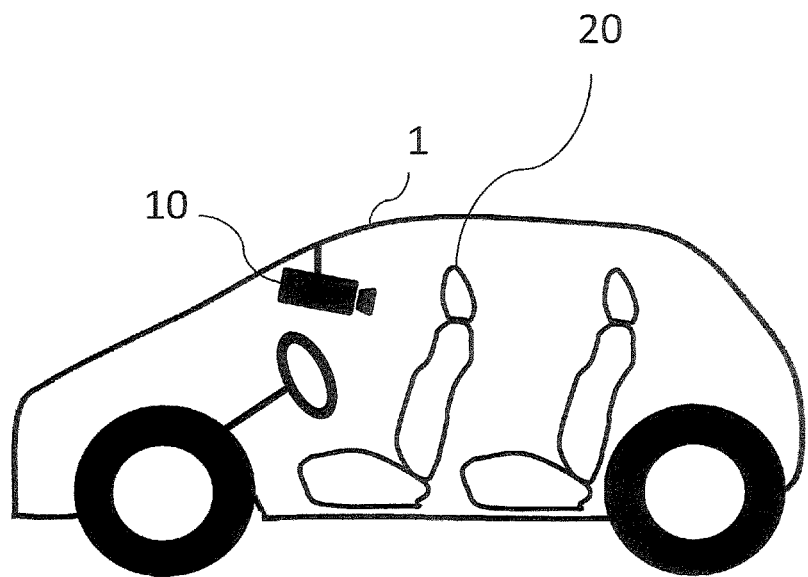
FIG. 1A is a perspective side view of a vehicle.
Figure 1B:
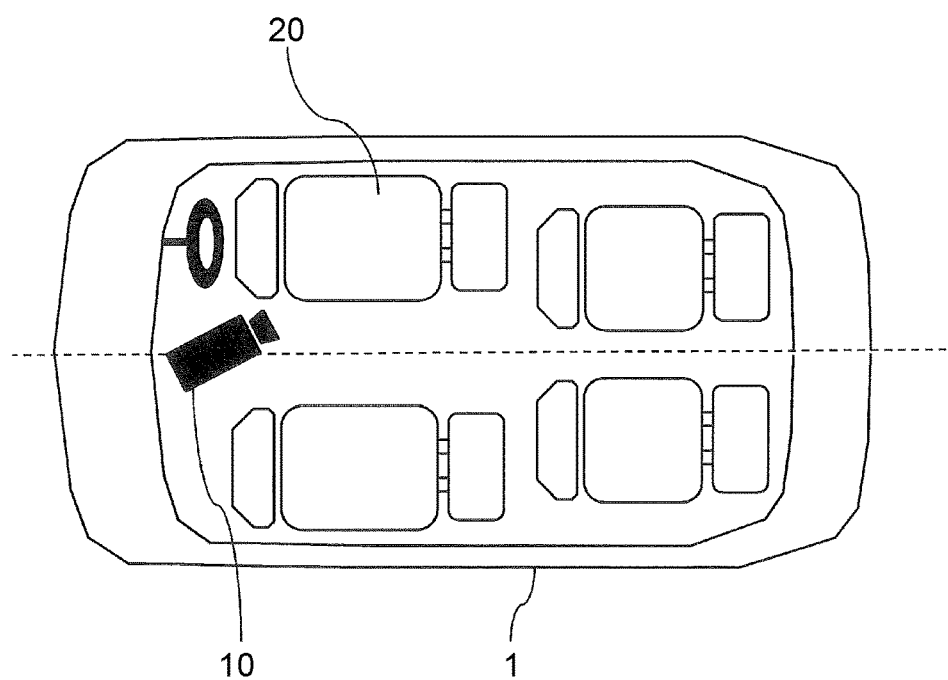
FIG. 1B is a perspective plan view of the vehicle.

Conventionally, the technology, which involves learning the states of occupants of a vehicle and then detecting the state of an occupant on the basis of the result of the learning, has used a camera that is mounted in the interior of the vehicle. An example of the mounting of the camera is shown in FIGS. 1A and 1B. FIG. 1A is a perspective side view of the vehicle and FIG. 1B is a perspective plan view of the vehicle.

Camera 10 is a near-infrared camera, for example, and is mounted in the vicinity of the ceiling of interior of vehicle 1. The angle of camera 10 is adjusted such that it can photograph an occupant who is sitting in driver's seat 20.

Figure 2A:
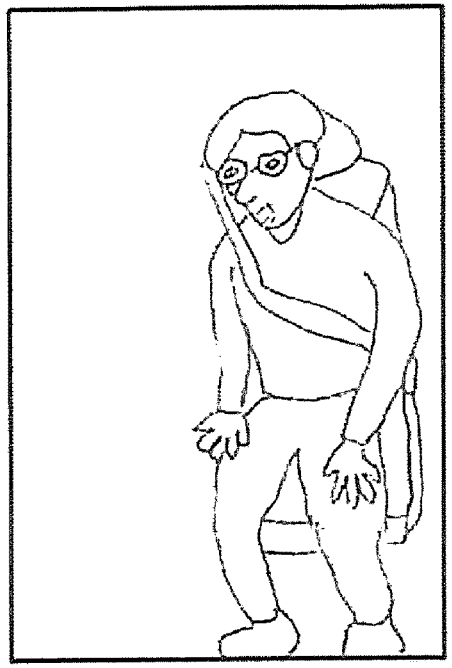
FIG. 2A is a view of an example of a photographed image of a state of sitting (where a person is sitting).
Figure 2B:
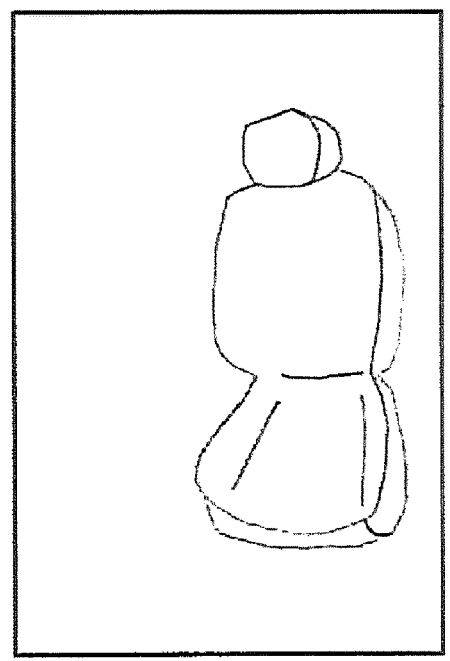
FIG. 2B is a view of an example of a photographed image of a state of not sitting (where no person is sitting).

Examples of images that are photographed with camera 10 mounted in this way are shown in FIGS. 2A and 2B. FIG. 2A shows an example of the image that is obtained by photographing a state where an occupant is sitting in driver's seat 20 (hereinafter, referred to as a sitting state). FIG. 2B shows an example of the image that is obtained by photographing a state where no occupant is sitting in driver's seat 20 (hereinafter, referred to as a not-sitting state).

Then, the images shown in FIGS. 2A and 2B are supplied to supervised machine learning such as a support vector machine (SVM), for example. In the SVM, a large amount of learning is performed for each of the following images, for example. Such images include: images of sitting states serving as correct images (correct samples) as shown in FIG. 2A, and images of not-sitting states serving as incorrect images (incorrect samples) as shown in FIG. 2B. Through the learning, a learning model is created to distinguish between sitting states and not-sitting states.

Figure 3:
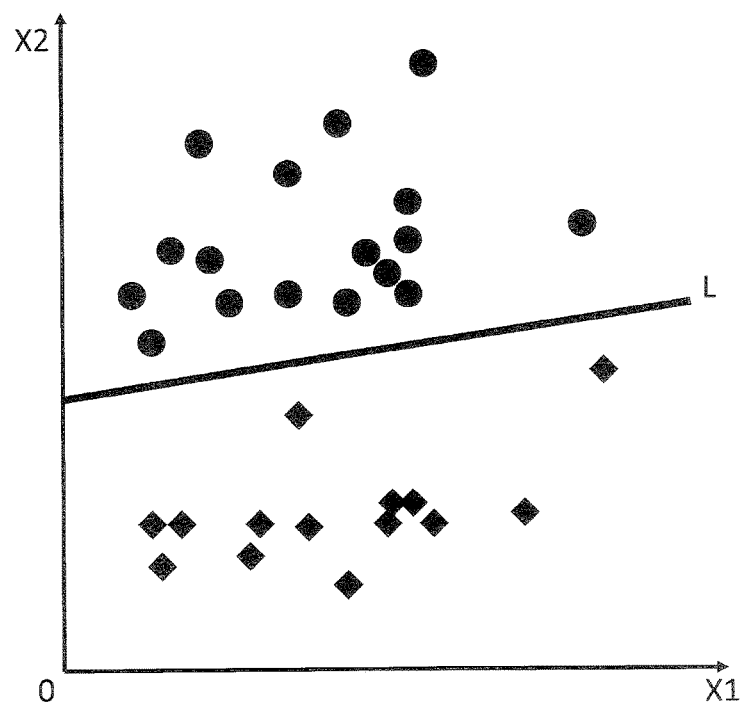
FIG. 3 is a graph plotting an example of amounts of features.

The learning model will be described with reference to FIG. 3. FIG. 3 is a graph plotting an example of amounts of features that are extracted from each of the correct images and incorrect images. Note that FIG. 3 shows the case where the extracted features can be expressed two-dimensionally, for the sake of convenience of description.

The points indicated by black circles express the amounts of features (hereinafter, referred to as first feature amounts) which are extracted from the correct images, while the points indicated by black rhombuses express the amounts of features (hereinafter, referred to as second feature amounts) which are extracted from the incorrect images. In this way, when both a first feature amount group and a second feature amount group are extracted, straight-line L is determined such that both distances to the line from the first feature amount group and the second feature amount group are maximum. Above straight-line L, plotted are feature amounts extracted from the correct images (sitting states); below straight-line L, plotted are feature amounts extracted from the incorrect images (not-sitting states). The learning model is a function for use in calculating numerical values to be used to distinguish whether the plotted positions of the feature amounts are above straight-line L or below straight-line L.

In the meanwhile, there are many types of vehicles, with different vehicle's heights, different positions of rear-view mirrors and interior lights, different interior designs, etc. for different types. Therefore, there is a possibility that the mounting position of a camera differs depending on the type of vehicle. Note that the terms "mounting position of a camera" used in the descriptions of the embodiment include a mounting angle of the camera.

Different mounting positions of a camera result in different photographed images as to how an occupant appears to be (hereinafter, referred to as "appearance"). For example, in the case where camera 10 is mounted at a position closer to the occupant and at a larger pitch angle that at the position and the pitch angle when the image shown in FIG. 2A is photographed, the occupant's seating state is photographed to produce an image shown in FIG. 4. In the image shown in FIG. 4, the occupant appears to be larger and the occupant's upper body appears to lean on the left, compared to the image shown in FIG. 2A. That is, although the image in FIG. 2A and the image in FIG. 4 are equal in that they are images obtained by photographing the same occupant's sitting sate, yet they are different from each other in appearances of the photographed occupants.

Figure 4:
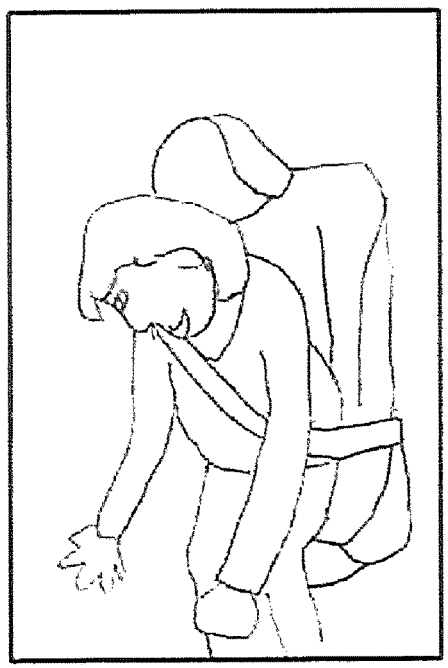
FIG. 4 is a view of another example of a photographed image of a state of sitting.
Figure 5:
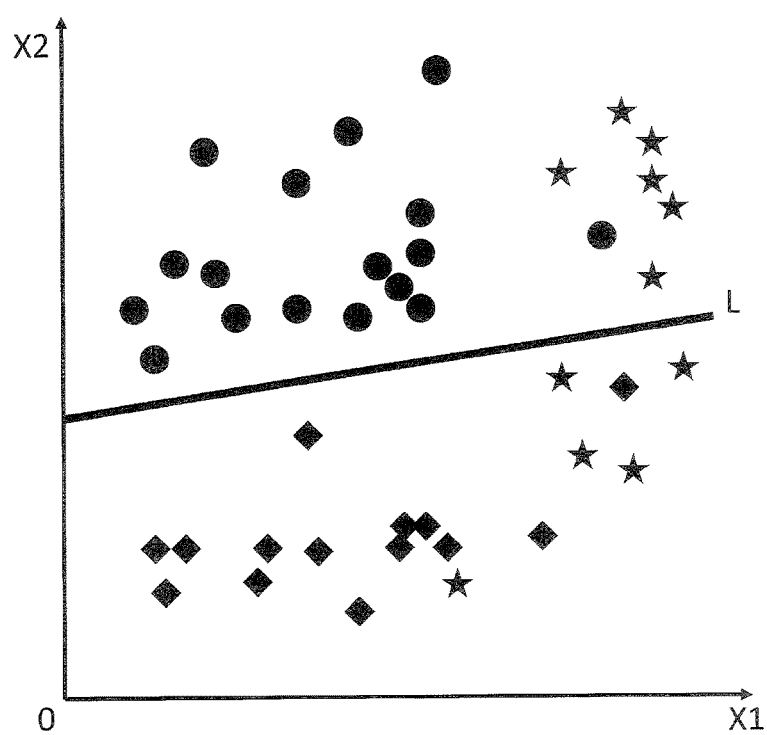
FIG. 5 is a graph plotting another example of amounts of features.

When such an image shown in FIG. 4 is used as a correct image for learning, the resulting feature amount extracted from it differs from that from FIG. 2A. An example of the result is shown in FIG. 5. The star dots represent the feature amounts that are extracted from the image such as that shown in FIG. 4. The star dots are distributed both above and below straight-line L. For this reason, it is difficult to accurately distinguish between the sitting state and the not-sitting state.

For achieving a highly accurate distinction, it is sufficient to create such a learning model for every mounting position of the camera. However, this generally requires that a large number of both correct images and incorrect images be prepared, with the number being on the order of at least a hundred thousand. In addition, such correct images are required to be images each of which depicts a different occupant having been photographed in different conditions (in terms of postures, physical features, clothing, etc.). For this reason, creation of the learning model for every mounting position of the camera will require a large amount of costs.

Hence, the present disclosure focuses on creation of one learning model which is applicable to a plurality of mounting positions of a camera. In other words, the learning model independent of mounting positions of a camera is created. To achieve this, images are transformed (also referred to as "normalized") such that appearances of occupants depicted in the images become equivalent to each other (equivalent appearance), among the images which includes correct images used for learning, incorrect images used for the learning and a photographed image which depicts a state to be detected. If the appearances of the occupants in the images are equivalent to each other, amounts of features extracted from the images are then close to each other. This allows the creation of the learning model which makes it possible to detect states with high accuracy. In transforming the images, a transformation parameter is used; this will be described later.

Since the occupant seated in a seat will take various postures, the angle of the occupant's body can be not always approximated by the angle of the seat's backrest. However, the occupant's posture is restricted by either the angle of the seat's backrest or the position of the seat. As a result, the difference in appearance of the occupant can be approximated by the difference in appearance of the seat.

Moreover, the seats of vehicles somewhat differ in shape depending on the types of the vehicles; however, their size, positions, and the like can be almost equated with each other. Therefore, there is a correlation between the appearance of a seat and the mounting position of a camera.

For the reason described above, in the present disclosure, the correct images and incorrect images are transformed when being learned, such that the appearances of the seats depicted in the images become equivalent to each other. Then, on the basis of the images having been transformed, one learning model is created which is independent of the mounting positions of the camera. This eliminates the need for preparing a large number of images to be used for learning, for every mounting position of the camera, which results in reduced costs.

Moreover, in the present disclosure, when the state of an occupant is detected, the photographed image which depicts the state to be detected is transformed such that the appearance of the seat in the photographed image becomes equivalent to the appearance of the seat as learning. Then, on the basis of the transformed image and the learning model described above, the state of the occupant is detected. This allows a highly accurate detection of the state of the occupant.

Hereinafter, embodiments of the present disclosure will be described in detail with reference to the accompanying drawings. Note that, in the following descriptions, the meaning of term "image" includes a literal meaning of "image," and a meaning of "data of an image" which are electrically processable.

Configuration of Learning Apparatus

Figure 6:
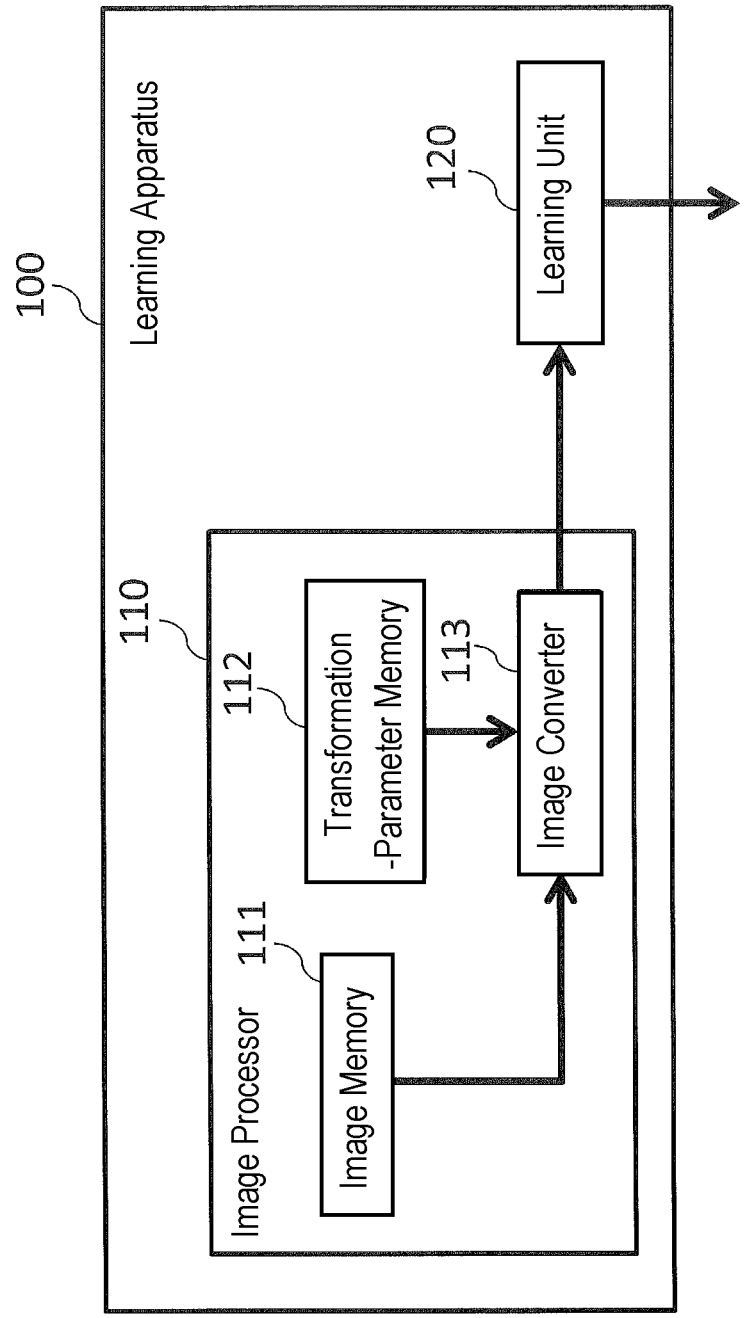
FIG. 6 is a block diagram of a configuration example of a learning apparatus according to an embodiment of the present disclosure.

FIG. 6 is a block diagram of a configuration example of learning apparatus 100 according to the embodiment.

Learning apparatus 100 includes image processor 110, and learning unit 120. Image processor 110 includes image memory 111 (hereinafter, referred to as memory 111), transformation-parameter memory 112 (hereinafter, referred to as memory 112), and image converter 113 (hereinafter, referred to as converter 113). Learning apparatus 100 creates a learning model for use in detection apparatus 101 which is described later.

Note that, although not shown in the figures, learning apparatus 100 and image processor 110 include a central processing unit (CPU), a nonvolatile storage medium such as a read-only memory (ROM) in which a control program is stored, a working memory such as a random-access memory (RAM), and a communication circuit, for example. In this case, functions of each of the units shown in FIG. 6 are implemented by the CPU by executing the control program.

Memory 111 stores a plurality of correct images and a plurality of incorrect images. These images are to be used for learning. The correct images are images each of which depicts a sitting state of an occupant, for example (see FIGS. 2A and 4, for example). The incorrect images are images each of which depicts a not-sitting state of an occupant, for example. The incorrect images include an image of a seat without any occupant being seated (see FIG. 2B, for example) as well as the images of the occupants in not-sitting states.

It is only required that the correct images and incorrect images be photographed for every mounting position of the camera; therefore, there is no need for preparing images for every posture and every kind of clothes of the occupant.

Moreover, information is associated with each of the correct images and incorrect images. The information indicates the mounting position (hereinafter, referred to as mounting-position information) of the camera that has been used to photograph the images.

Note that, in the embodiment, the descriptions are made using the case where the occupant sitting in the seat is a person; however, the occupant is not limited to a person. The occupant may be another creature such as a dog.

Memory 112 stores the transformation parameter. The transformation parameter is one for use in transforming each of the images which are photographed with a plurality of cameras that are mounted at different positions. Specifically, the transformations are carried out for the correct images, incorrect images, and photographed image such that the appearance of the seat (i.e. how the seat appears to be) in each of these images is approximated to the appearance of a predetermined seat (or, alternatively, the appearance of the seat is equal to the appearance of a predetermined seat).

The transformation parameter is calculated for each of the mounting positions of the camera. Therefore, memory 112 stores a plurality of the transformation parameters. The mounting-position information indicating the corresponding mounting position of the camera is associated with the respective transformation parameter. The calculation method will be described later.

Converter 113 reads the correct images and incorrect images from memory 111, and reads (acquires) the transformation parameters from memory 112. The read parameters correspond to the mounting-position information associated with the thus-read images. That is, memory 111 stores, in advance, the data of the correct images and the data of the incorrect images, and then outputs these stored data, i.e. the data of the correct images and the data of the incorrect images, to converter 113.

Then, converter 113 transforms the thus-read correct images and the thus-read incorrect images, on the basis of the thus-read respective transformation parameters. Hereinafter, the correct images having been transformed are referred to as "transformed correct images," while the incorrect images having been transformed are referred to as "transformed incorrect images."

As a result of the image transformation processing, the appearances of seats depicted in the correct images and incorrect image become equivalent to each other, even if these images have been photographed with cameras mounted at different positions.

Then, converter 113 outputs the transformed correct images and the transformed incorrect images to learning unit 120. Learning unit 120 receives the transformed correct images and the transformed incorrect images from converter 113. Then, learning unit 120 extracts amounts of features from the transformed correct images and the transformed incorrect images, and then creates a learning model on the basis of the thus-extracted amounts of the features.

Then, learning unit 120 outputs the thus-created learning model to a predetermined apparatus. Such a predetermined apparatus includes, for example: detector 140 (see FIG. 11) of detection apparatus 101 to be described later, and a memory apparatus (not shown) accessible from detector 140.

Operation of Learning Apparatus

Figure 7:
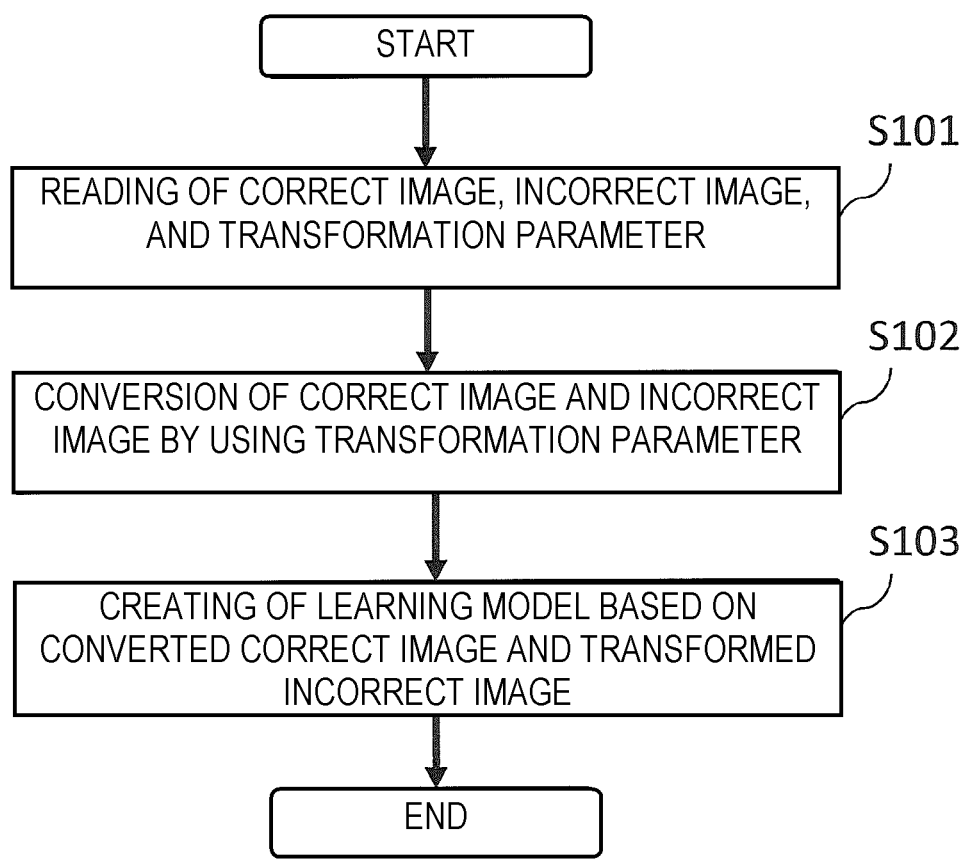
FIG. 7 is a flowchart illustrating an operation example of the learning apparatus according to the embodiment of the disclosure.

Next, an operation of learning apparatus 100 will be described with reference to FIG. 7. FIG. 7 is a flowchart illustrating an operation example of learning apparatus 100.

First, converter 113 reads the correct images, incorrect images, and transformation parameters corresponding to these images (Step S101).

Next, converter 113 transforms the correct images and the incorrect images, through use of the transformation parameters (Step S102). Then, converter 113 outputs the transformed correct images and the transformed incorrect images to learning unit 120.

Learning unit 120 creates a learning model on the basis of the transformed correct images and transformed incorrect images both received from converter 113 (Step S103). Then, learning unit 120 outputs the thus-created learning model to the predetermined apparatus.

Calculation Example of Transformation Parameter

Next, a calculation example of the transformation parameter will be described with reference to FIGS. 8 to 10. Hereinafter, the example is described using a case of a projective transformation. Note that, the calculation processing of the projective transformation to be described below may be performed by learning apparatus 100 or another apparatus (not shown); however, the following description will be made using a case where learning apparatus 100 calculates the transformation parameter.

Figure 8:
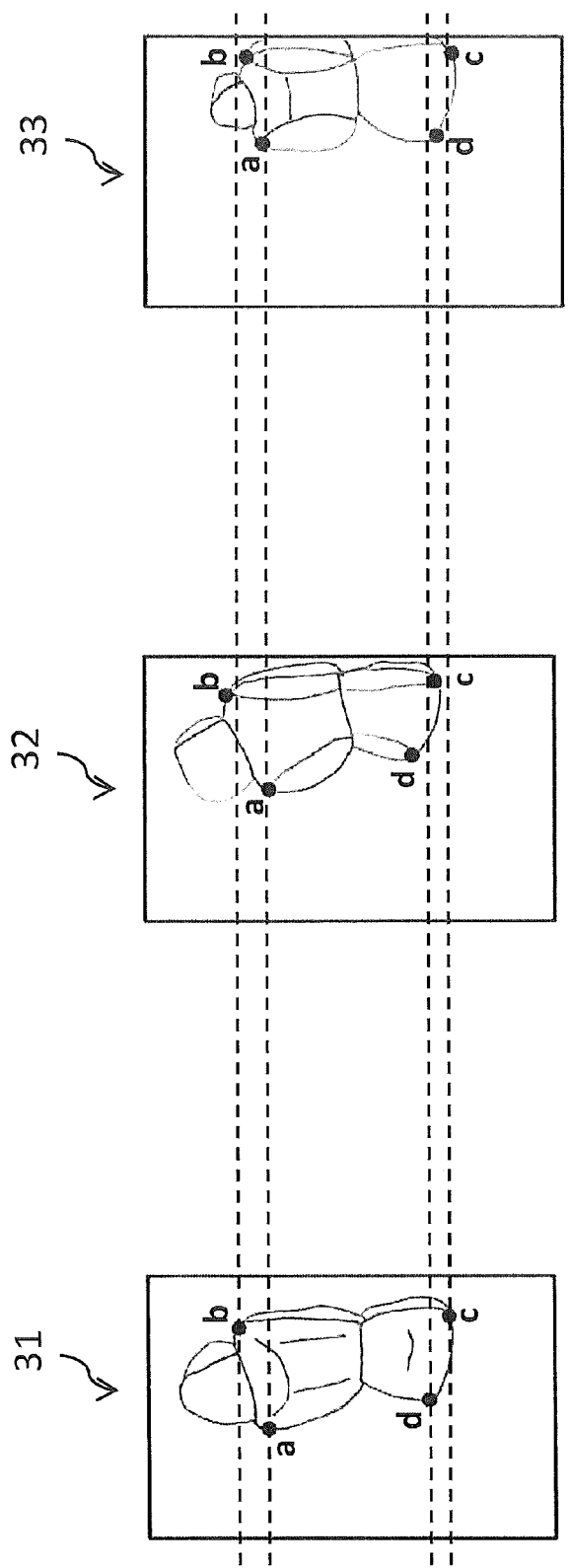
FIG. 8 is a view illustrating an example of images that are used in processing for calculating a transformation parameter.

First, learning apparatus 100 receives images 31 to 33, shown in FIG. 8, from a predetermined apparatus (a camera or an image memory apparatus), for example. Images 31 to 33 are ones in each of which a seat has been photographed. The mounting positions of the cameras that has photographed images 31 to 33 are different from each other. Accordingly, the appearances of the seats depicted in images 31 to 33 are different from each other. The dashed lines shown in FIG. 8 indicate the positions of points "a" to "d" of image 31, thereby making it easier to recognize differences (discrepancies) in positions of points "a" to "d" that are defined on the seat, among the images.

Next, learning apparatus 100 calculates coordinates of points "a" to "d" defined on the seat depicted in each of images 31 to 33. Point "a" indicates an upper right point of the backrest of the seat; point "b" indicates an upper left point of the backrest of the seat. Moreover, point "c" indicates a front left point of the seating face of the seat; point "d" indicates a front right point of the seating face of the seat.

An example of the coordinates calculated in this way is shown in FIG. 9. FIG. 9 shows x-coordinates and y-coordinates of points "a" to "d" that are calculated for each of the images. Moreover, reference coordinates shown in FIG. 9 have been determined in advance as target coordinates to be achieved via transformation.

Learning apparatus 100 calculates the transformation parameters such that the coordinates of points "a" to "d" of respective images 31 to 33 are transformed to match the reference coordinates for points "a" to "d." In this way, the transformation parameters are calculated for images 31 to 33, respectively. That is, the transformation parameter is calculated for every mounting position of the camera.

Then, learning apparatus 100 causes memory 112 to store the thus-calculated transformation parameters, for example. At this time, as described above, the mounting-position information which indicates the mounting position of the camera is associated with the transformation parameter. Note that, before shipment of the product, i.e. learning apparatus 100, the thus-calculated transformation parameter is stored in memory 112 of learning apparatus 100, for example.

Figure 10:
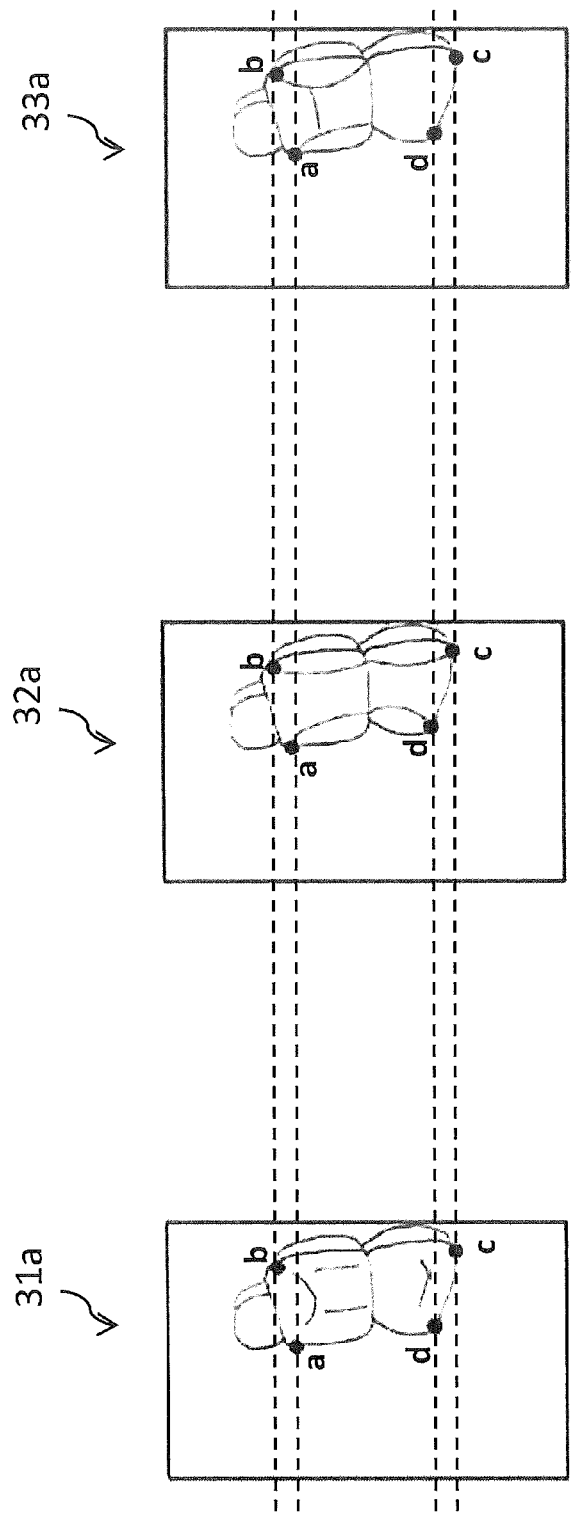
FIG. 10 is a view illustrating an example of images that have been transformed by using the transformation parameter.

FIG. 10 shows an example of the images which have been transformed on the basis of the calculated transformation parameters, respectively. Image 31a is one that has been transformed from image 31 shown in FIG. 8, using one of the transformation parameters. Like this, images 32a and 33a are ones that have been transformed from images 32 and 33 shown in FIG. 8, using the respective transformation parameters. In this way, in images 31a to 33a after transformation, as indicated by the dashed lines of FIG. 10, the apparent positions of points "a" to "d" on the seats match each other. That is, the positional discrepancies shown in FIG. 8 are eliminated. In this way, the appearances of the seats depicted in images 31a to 33a become equivalent to each other.

Note that the appearances of the seats depicted in the images are different depending on not only the differences in mounting positions of the camera, but also differences in the following factors of each of the photographed seats. Such factors include: an actual seat angle (e.g. backrest angle) and an actual seat position (e.g. position of the front end of the seating face), in the interior of the vehicle. For this reason, both information on the seat angle and information on the seat position may be associated with each of images 31 to 33. In this case, the transformation parameter may be calculated by using coordinates of a plurality of points on the seat depicted in each of the images. The coordinates are determined on the basis of the seat angle, the seat position, and the mounting position of the camera. Moreover, in cases where the transformation parameter is calculated for every mounting position of the camera, the transformation parameter may be calculated by using a typical numerical value of each of the seat angle and seat position that have been determined in advance for every mounting position of the camera. Such typical numerical values of the seat angle and seat position are respectively values of a seat angle and seat position, for example, in a case where a man having a typical physique and being expected to become an occupant of the vehicle is seated.

Configuration of Detection Apparatus

Figure 11:
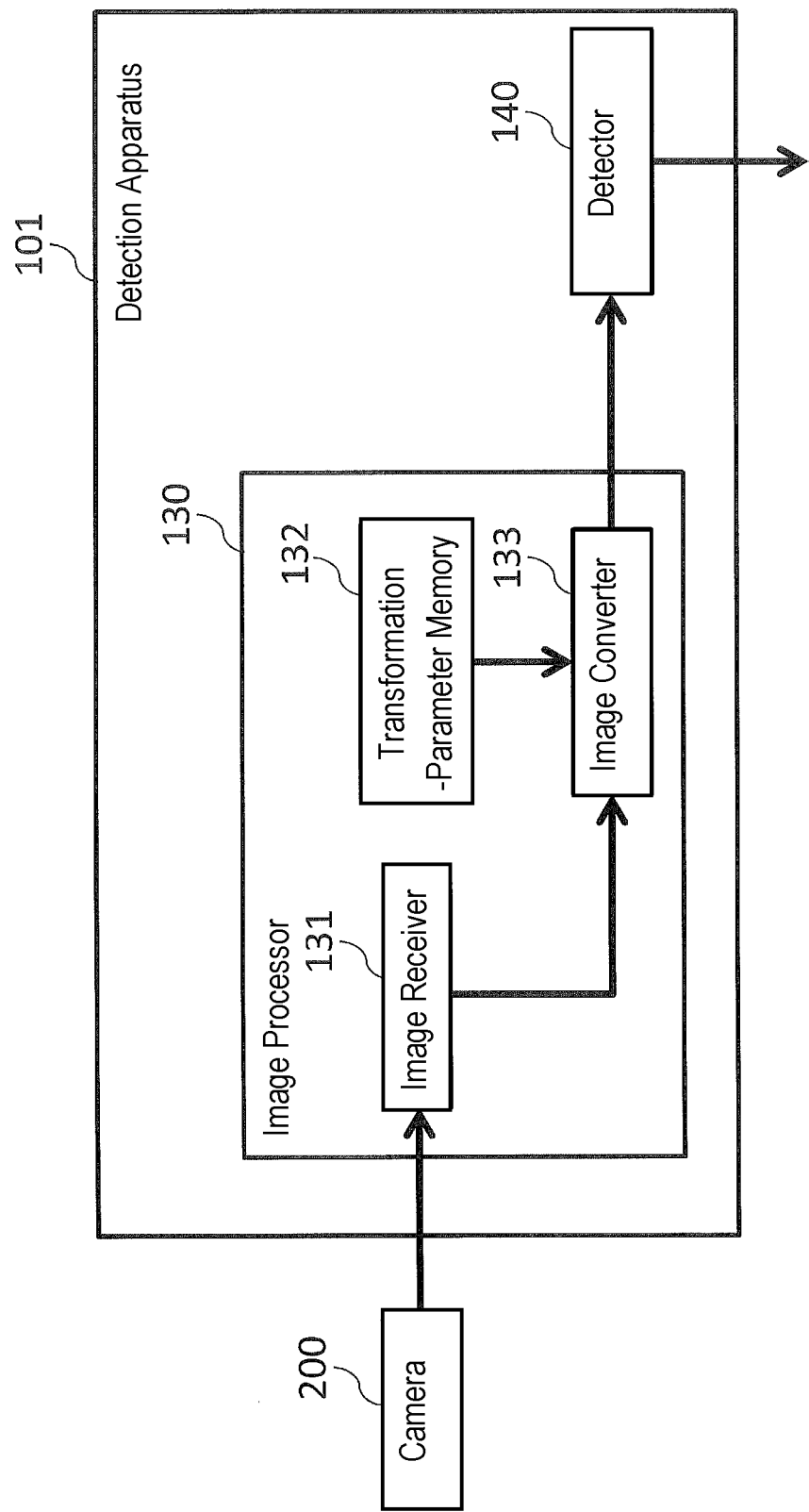
FIG. 11 is a block diagram of a configuration example of a detection apparatus according to the embodiment of the present disclosure.

Next, a configuration of detection apparatus 101 according to the embodiment will be described with reference to FIG. 11. FIG. 11 is a block diagram of a configuration example of detection apparatus 101.

Detection apparatus 101 is used in a movable body such as a vehicle, for example. That is, detection apparatus 101 may be a mounted-in-vehicle apparatus or, alternatively, an apparatus to be carried into a vehicle. Note that, in the embodiment, the description will be made using a case where detection apparatus 101 is applied in a vehicle serving as an application object; however, the application object is not limited to this.

Detection apparatus 101 includes image processor 130 and detector 140. Image processor 130 includes image receiver 131 (hereinafter, referred to as receiver 131), transformation-parameter memory 132 (hereinafter, referred to as memory 132), and image converter 133 (hereinafter, referred to as converter 133).

Note that, although not shown in the figures, detection apparatus 101 and image processor 130 include: a CPU; a nonvolatile storage medium such as a read-only memory (ROM) in which a control program is stored; a working memory such as a random-access memory (RAM); and a communication circuit, for example. In this case, functions of each of the units shown in FIG. 11 are implemented by the CPU by executing the control program.

Receiver 131 receives, from camera 200, a photographed image which depicts a state to be detected. As in the case of camera 10 shown in FIGS. 1A and 1B, camera 200 is disposed at a predetermined position of the interior of a vehicle, and photographs a seat or an occupant sitting in the seat. Note that, in this case as an example, camera 200 is fixed and mounted at a predetermined position of the interior of the vehicle, before shipment of the vehicle.

Receiver 131 outputs, to converter 133, the photographed image received from camera 200. That is, receiver 131 acquires data of the image photographed with camera 200, and then outputs the data to converter 133.

Note that, the description has been made using the case where receiver 131 receives the photographed image from camera 200; however, receiver 131 may receive the photographed image from another apparatus (for example, a memory apparatus which receives the photographed image from camera 200) other than camera 200.

Memory 132 stores a transformation parameter that corresponds to the mounting position of camera 200. That is, memory 132 corresponds to memory 112 of learning apparatus 100 shown in FIG. 6. The transformation parameter has been calculated in advance corresponding to the mounting positions of camera 200, as described earlier in the section "Calculation Example of Transformation Parameter." For example, the parameter is stored in memory 132 before shipment of the product, i.e. detection apparatus 101.

Converter 133 receives the photographed image from receiver 131, and reads the transformation parameter from memory 132. Then, converter 133 transforms the photographed image on the basis of the transformation parameter. Hereinafter, the photographed image having been transformed is referred to as "a transformed photographed-image." Then, converter 133 outputs the transformed photographed-image to detector 140.

Detector 140 receives the transformed photographed-image from converter 133, and then extracts feature amounts from the thus-received transformed photographed-image. Then, detector 140 detects the state of the occupant (as to whether the occupant is in a sitting state or in a not-sitting state, for example) on the basis of both the thus-extracted feature amounts and the learning model created by learning apparatus 100.

Moreover, detector 140 outputs information that indicates the result of the detection, to a predetermined apparatus. Hereinafter, the information is referred to as "detection result information". Such a predetermined apparatus, although not shown in the figures, includes an electronic control unit (ECU) that controls travelling of the vehicle, and a memory apparatus, for example.

Operation of Detection Apparatus

Figure 12:
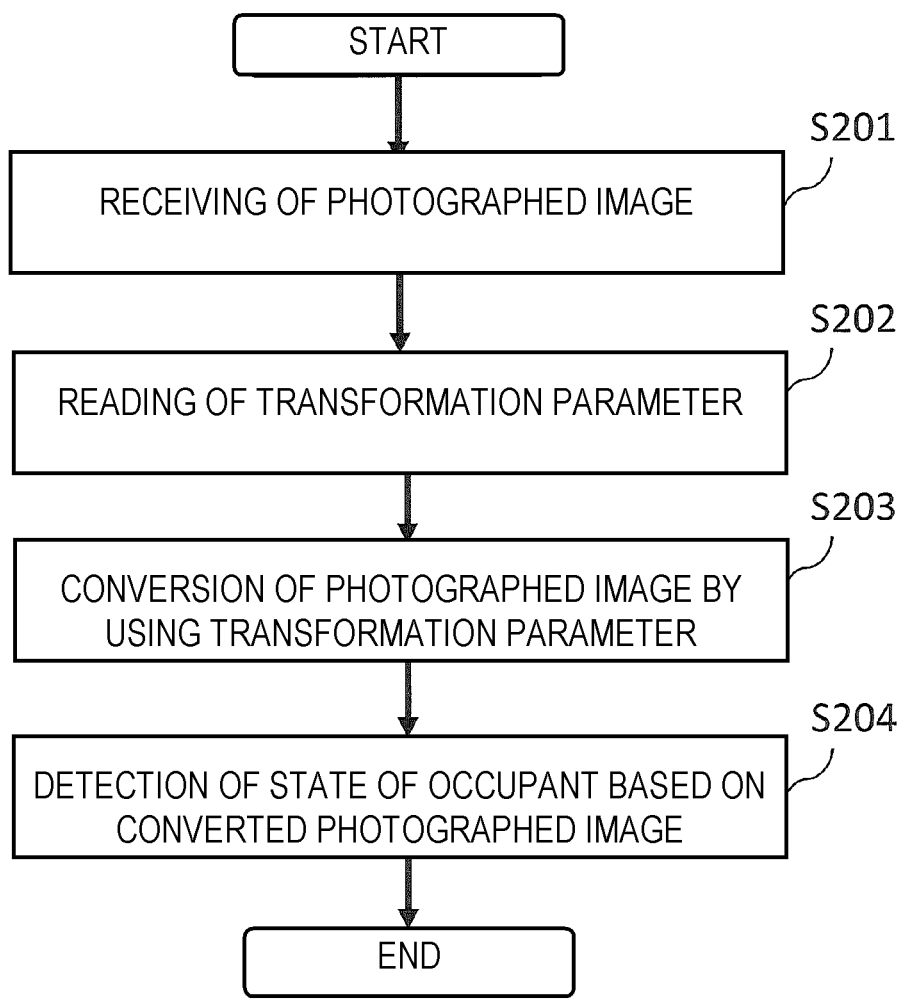
FIG. 12 is a flowchart illustrating an operation example of the detection apparatus according to the embodiment of the disclosure.

An operation of detection apparatus 101 will be described with reference to FIG. 12. FIG. 12 is a flowchart illustrating an operation example of detection apparatus 101.

First, receiver 131 receives a photographed image from camera 200 (Step S201). Then, receiver 131 outputs the thus-received photographed image to converter 133.

Converter 133 receives the photographed image from receiver 131, and reads a transformation parameter from memory 132 (Step S202).

Next, converter 133 transforms the photographed image through use of the transformation parameter (Step S203). Converter 133 outputs the thus-transformed photographed image to detector 140.

Detector 140 detects the state of an occupant on the basis of the thus-transformed photographed image received from converter 133 (Step S204). Then, detector 140 outputs detection result information to a predetermined apparatus.

Advantageous Effects of Embodiment

As described above, in accordance with the embodiment, when being learned, each of the correct images and incorrect images which have been photographed with cameras mounted at different positions is transformed such that the appearances of seats depicted in these images become equivalent to each other. Then, on the basis of each of the images having been transformed, one learning model is created which is independent of the mounting positions of the cameras. This eliminates the need for preparing a large number of different images to be used for the learning, for every mounting position of the camera, resulting in a reduction in cost.

Moreover, when the state of the occupant is detected, the photographed image which depicts the occupant's state to be detected is transformed such that the appearance of the seat in the photographed image becomes equivalent to the appearance of the seat at the time when the learning has been performed. Then, the state of the occupant is detected on the basis of both the thus-transformed image and the learning model described above. This allows a highly accurate detection of the state of the occupant.

MODIFICATION EXAMPLES

As described above, the descriptions have been made regarding the embodiment of the present disclosure; however, the present disclosure is not limited to the descriptions, and various modifications to the embodiment are possible to be made. Hereinafter, examples of such various modifications will be described.

First Modification Example

In the embodiment described above, the descriptions have been made using the case where the transformation parameter is calculated such that the coordinates of the four points (points "a" to "d") of each of the images are transformed to match the reference coordinates. However, the method of calculating the transformation parameter is not limited to this. For example, the transformation parameter may be calculated through use of a line that connects predetermined points on a seat depicted in an image. Regarding this specific example, descriptions will be made with reference to FIGS. 13 and 14.

To begin with, a first calculation method is described with reference to FIG. 13.

For example, learning apparatus 100 shown in FIG. 6 starts by receiving images 41 and 42 from a predetermined apparatus (a camera or an image memory apparatus). Images 41 and 42 are images of a seat which are photographed with cameras mounted at different positions.

Next, learning apparatus 100 calculates line segments L1 and L2 in images 41 and 42, respectively. Each of line segments L1 and L2 is a virtual line that connects between points, i.e. vertex-point "e" of a seat's headrest and mid-point "f" of a boundary line between a seat's backrest and a seating face, in the corresponding image. Moreover, learning apparatus 100 calculates an inclination (angle) of each of line segments L1 and L2. The inclination is an angle at which the corresponding line segment is inclined with respect to the vertical direction of each of images 41 and 42, for example.

Next, learning apparatus 100 calculates the respective transformation parameters such that the inclination of each of line segments L1 and L2 is transformed to match a predetermined angle (e.g. an angle of a line along the vertical direction). Then, learning apparatus 100 associates mounting-position information with the respective calculated transformation parameters, and then stores the calculated transformation parameters together with the associated mounting-position information, into memory 112.

Figure 13:
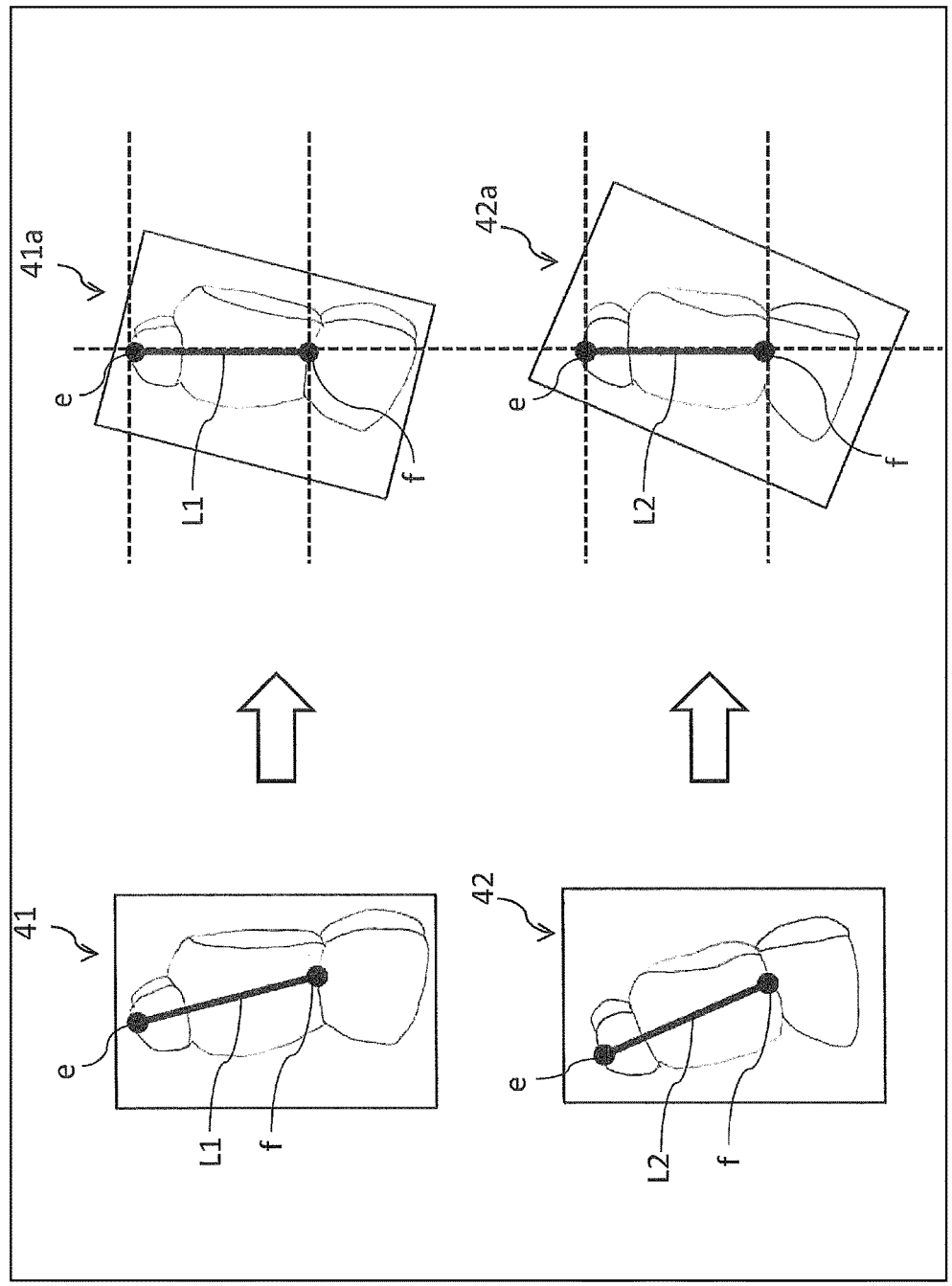
FIG. 13 is a view illustrating an example of processing for calculating a transformation parameter according to a modification example of the present disclosure.

Images 41a and 42a shown in FIG. 13 are images that have been transformed from images 41 and 42, respectively, through use of the thus-calculated transformation parameters. In images 41a and 42a, line segments L1 and L2 have been transformed to vertical ones, so that the appearances of both seats are approximated to each other.

Next, a second calculation method is described with reference to FIG. 14.

For example, learning apparatus 100 shown in FIG. 6 starts by receiving images 51 and 52 from a predetermined apparatus (a camera or an image memory apparatus). Images 51 and 52 are images each of which depicts a seat with an occupant being seated in the seat, and are photographed with cameras mounted at different positions.

Next, learning apparatus 100 calculates line segments L1 and L2 in images 51 and 52, respectively. Line segments L1 and L2 are as described in the first calculation method.

Next, learning apparatus 100 calculates the respective transformation parameters such that the inclination of each of line segments L1 and L2 is transformed to match a predetermined angle (e.g. an angle of a line along the vertical direction).

Figure 14:
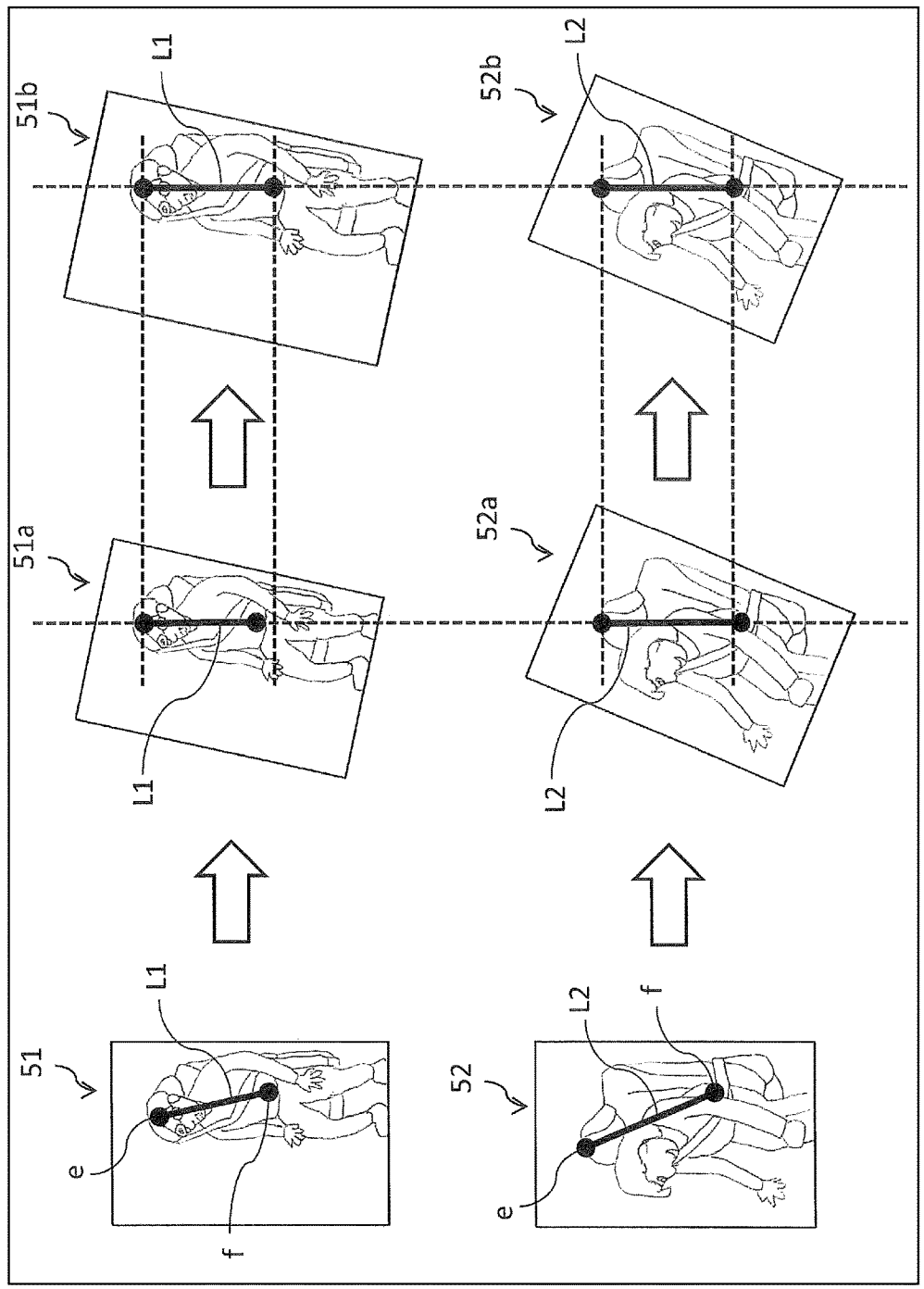
FIG. 14 is a view illustrating an example of processing for calculating a transformation parameter according to another modification example of the disclosure.

Images 51a and 52a shown in FIG. 14 are images which have been transformed from images 51 and 52, respectively, through use of the thus-calculated transformation parameters. In images 51a and 52a, line segments L1 and L2 have been transformed to vertical ones, so that the appearances of the seats and the occupants being seated in the seats are approximated to each other between the images.

Next, learning apparatus 100 corrects the transformation parameters such that the length of each of line segments L1 and L2 is transformed to match a predetermined length. Then, learning apparatus 100 associates mounting-position information with the thus-corrected transformation parameters, respectively, and then stores the corrected transformation parameters together with the associated mounting-position information, into memory 112.

Images 51b and 52b shown in FIG. 14 are images which have been transformed from images 51a and 52a, respectively, through use of the corrected transformation parameters. In the case shown in FIG. 14, image 51a is enlarged to image 51b while image 52a is reduced to image 52b, so that the lengths of line segments L1 and L2 become equal to each other. This, in turn, causes the appearances of the seats and the occupants being seated in the seats to be approximated to each other between images 51b and 52b.

The transformation parameters thus-calculated in this way according to the modification example, is used in the image transformation processing (Step S102 in FIG. 7) of learning apparatus 100 and in the image transformation processing (Step S203 in FIG. 12) of detection apparatus 101, as in the case of the embodiment described above.

As described above, the transformation parameter according to the modification example is used to transform an image such that the inclination of a line segment matches a predetermined inclination. The line segment is defined based on predetermined points on the seat depicted in the image.

Second Modification Example

The above descriptions have been made using the case where memory 132 of detection apparatus 101 shown in FIG. 11 stores one transformation parameter that corresponds to each of the mounting positions of camera 200; however, the memory may store a plurality of transformation parameters corresponds to each of the mounting positions of camera 200.

For example, such a plurality of the transformation parameters is calculated, in advanced, for every seat angle and every seat position. Accordingly, both seat angle information and seat position information are associated with each of the plurality of the transformation parameters that is stored in memory 132.

In this case, converter 133 starts by receiving the seat angle information and seat position information from a seat sensor (not shown) which is capable of detecting the seat angle and seat position, via a controller area network (CAN), for example. Both the seat angle information and the seat position information indicate the seat angle and seat position, respectively, at a time when camera 200 photographs the image.

Next, converter 133 selects transformation parameters from the plurality of the transformation parameters stored in memory 132. The transformation parameters to be selected are associated with the seat angle information and seat position information which have been received from the seat sensor, respectively. Then, converter 133 reads the thus-selected transformation parameters from memory 132, and transforms the photographed image through use of the thus-read transformation parameters.

Note that the above description has been made using the case where converter 133 receives the seat angle information and seat position information from the seat sensor. However, converter 133 may acquire the seat angle information and seat position information after performing a predetermined image analysis of the photographed images that have been received from receiver 131, for example.

Moreover, the above description has been made using the case where both the seat angle information and the seat position information are associated with the plurality of the transformation parameters. However, only any one of the seat angle information and the seat position information may be associated with the transformation parameters.

In accordance with the modification example, the transformation parameters are calculated corresponding to at least one of the seat angle and the seat position. Then, converter 133 selects one of the transformation parameters on the basis of the information including; the mounting position of the camera; and at least one of the seat angle and the seat position at the time when the camera has photographed the image. The converter uses the thus-selected transformation parameter for the transforming. This makes it possible to cope with varying situations where the occupant changes the seat angle and/or seat position at a time when the detection of the occupant's state is performed, which results in an increase in detection accuracy.

Third Modification Example

In the embodiments described above, the descriptions have been made using the case where the camera has been fixed, in advance, at a predetermined position in the interior of a vehicle. However, the camera may be mounted by a user in the interior of a vehicle after the vehicle has been shipped as a product. In this case, a transformation parameter to be used in detecting an occupant's state is calculated or determined in the following manner.

First, an example in which the transformation parameter is calculated is described.

At a time when detection apparatus 101 shown in FIG. 11 is shipped as a product, a mounting position of the camera has yet to be determined. Accordingly, memory 132 stores no transformation parameter. Instead, memory 132 stores reference coordinates (the coordinates of points "a" to "d" shown in FIG. 9, for example).

Then, an image which depicts a state to be detected is photographed with the camera that has been mounted in the interior of the vehicle by the user.

First, converter 133 receives the photographed image via receiver 131, and reads the reference coordinates of the four points from memory 132. Next, converter 133 calculates coordinates of four points (points "a" to "d" shown in FIG. 8, for example) on a seat depicted in the photographed image, and then calculates the transformation parameter such that the thus-calculated coordinates are transformed to match the reference coordinates. Then, converter 133 transforms the photographed image through use of the thus-calculated transformation parameter. Moreover, converter 133 stores the thus-calculated transformation parameter in memory 132.

Next, an example in which the transformation parameter is determined is described.

At a time of detection apparatus 101 being shipped as a product, a plurality of transformation parameters is stored in memory 132. The stored parameters correspond to conceivable positions where the camera is expected to be mounted. In addition, the reference coordinates (the coordinates of points "a" to "d" shown in FIG. 9, for example) as well are stored in memory 132.

After that, the user mounts the camera in the interior of the vehicle. With the camera, an image which depicts a state to be detected is photographed.

First, converter 133 receives the photographed image via receiver 131, and reads, from memory 132, all the transformation parameters and the reference coordinates of the four points. Next, converter 133 calculates the coordinates of the four points (points "a" to "d" shown in FIG. 8, for example) on a seat depicted in the photographed image, and then transforms these coordinates through use of the transformation parameters separately. Next, converter 133 compares each of the thus-transformed coordinates with the reference coordinates. Resulting from the comparison, converter 133 selects transformed coordinates that are closest to the reference coordinates, from among the thus-transformed coordinates. Then, the transformation parameter that has been used in transforming to produce the thus-selected transformed coordinates is specified. Converter 133 determines to adopt the thus-specified transformation parameter as the transformation parameter to be used for transformation of the photographed image. Then, converter 133 performs the transformation of the photographed image through use of the thus-adopted transformation parameter.

Fourth Modification Example

In the embodiments described above, the descriptions have been made using the case where the transformation parameter is calculated on the basis of the apparent positions of the points on the seat serving as an object which is depicted in the image; however, such an object used for calculating the transformation parameter is not limited to this. For example, the transformation parameter may be calculated on the basis of the apparent positions of predetermined points on another object depicted in the image. Such another object may be an apparatus in the interior of the vehicle. The apparatus may be one that will impose restrictions on the position where an occupant is seated when riding on the vehicle, thus may be a steering wheel, for example. Alternatively, the transformation parameter may be calculated on the basis of the following factors, that is, both the apparent positions of predetermined points on a seat depicted in the image and the apparent positions of predetermined points on an in-the-interior apparatus depicted in the image.

Fifth Modification Example

In the embodiments described above, the descriptions have been made using the case where each of the to-be-leaned and to-be-detected objects is either the sitting state or the not-sitting state; however, the to-be-leaned and to-be-detected objects are not limited to these. For example, such objects may be the attitude, face, or the like of a person.

Sixth Modification Example

In the embodiments described above, the descriptions have been made using the case where learning apparatus 100 and detection apparatus 101 are separate apparatuses. However, learning apparatus 100 and detection apparatus 101 may be configured such that they are combined into one body as a learning-detection apparatus. In this case, image processor 110 and image processor 130 may be configured such that they are combined into one image processor.

Seventh Modification Example

Figure 15:
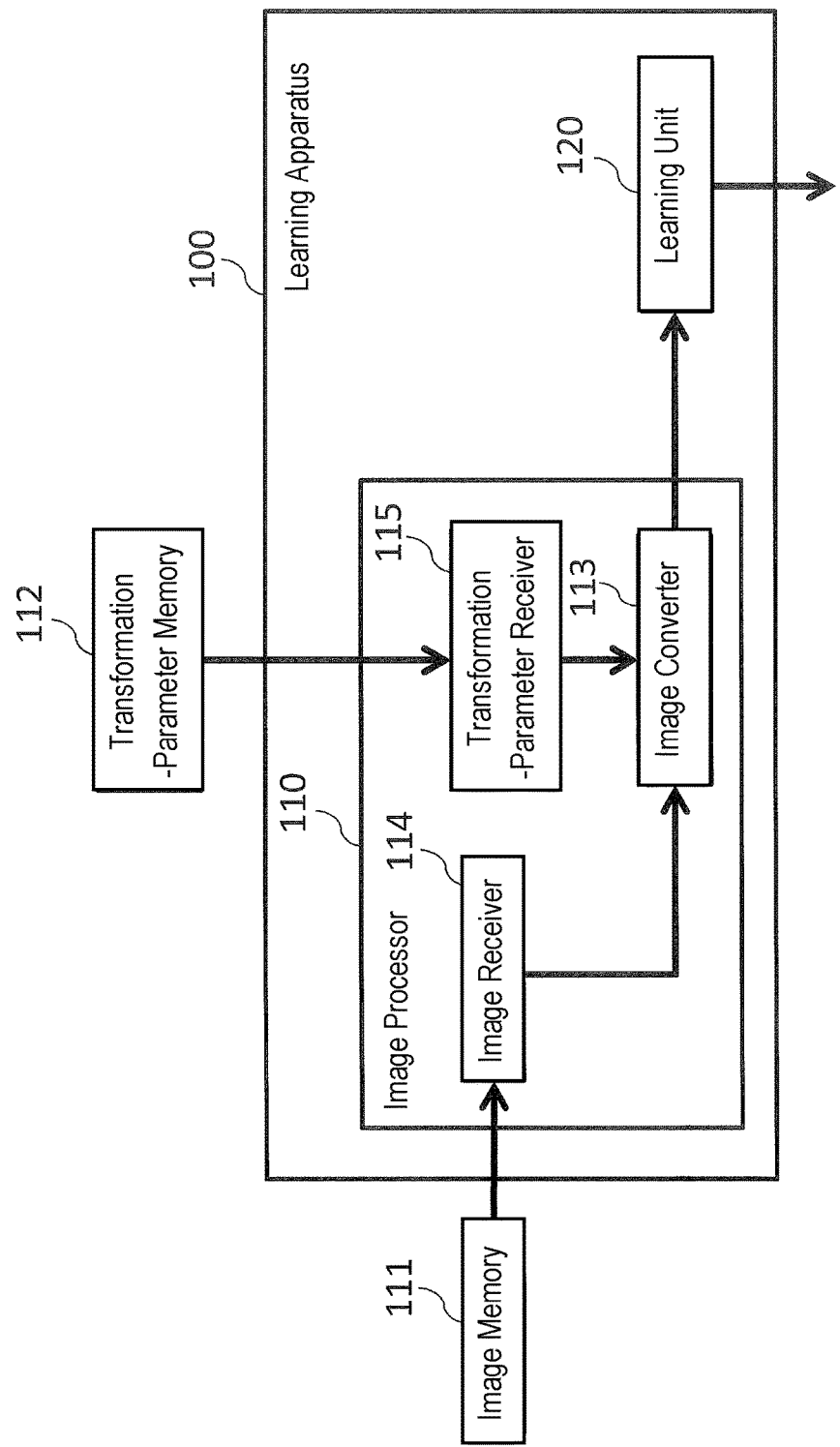
FIG. 15 is a block diagram of a configuration example of a learning apparatus according to a modification example of the present disclosure.

In the embodiments described above, the descriptions have been made using the case where image processor 110 of learning apparatus 100 includes memories 111 and 112. However, for example as shown in FIG. 15, memories 111 and 112 may be disposed on the outside of image processor 110. In this case, image processor 110 may include: image receiver 114 (hereinafter, referred to as receiver 114) which receives the correct image and incorrect image from memory 111; and transformation-parameter receiver 115 (hereinafter, referred to as an receiver 115) which receives the transformation parameter from memory 112. That is, receiver 114 receives, from the outside, the data of correct images and the data of incorrect images, and outputs the thus-received data to converter 113. Receiver 115 acquires the transformation parameter from the outside, and converter 113 acquires the transformation parameter from receiver 115. Note that, receivers 114 and 115 may be configured such that they are combined into one receiver.

Figure 16:
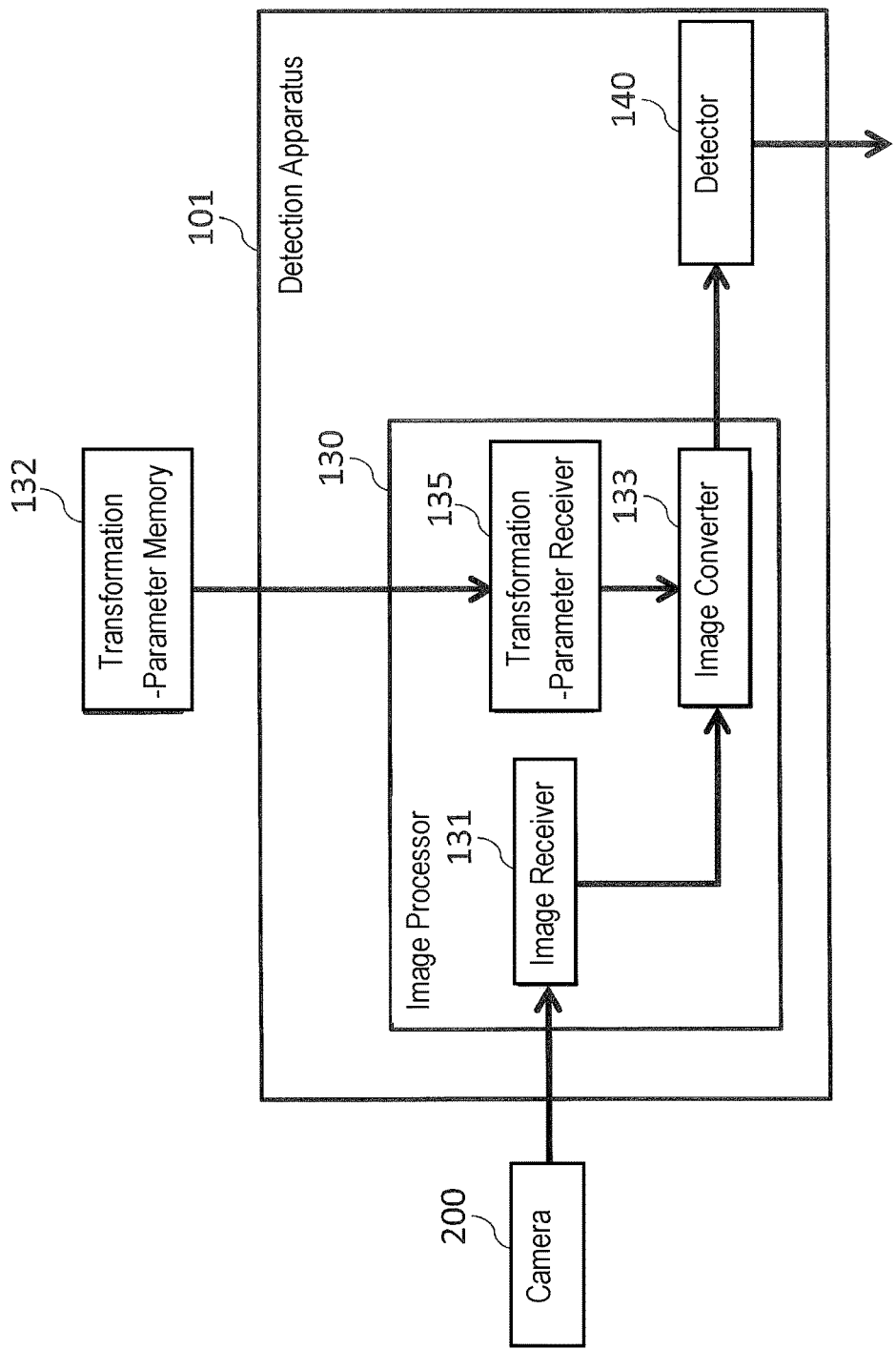
FIG. 16 is a block diagram of a configuration example of a detection apparatus according to a modification example of the present disclosure.

Moreover, in the embodiments described above, the descriptions have been made using the case where image processor 130 of detection apparatus 101 includes memory 132. However, for example as shown in FIG. 16, memory 132 may be disposed on the outside of image processor 130. In this case, image processor 130 may include transformation-parameter receiver 135 which receives the transformation parameter from memory 132. Note that image receiver 131 and transformation-parameter receiver 135 may be configured such that they are combined into one receiver.

As described above, image processors 110 and 130 according to the embodiments of the present disclosure include image converters 113 and 133, respectively. Each of image converters 113 and 133 transforms data of an image photographed with a camera, on the basis of a transformation parameter that has been calculated in accordance with a camera-position at which the camera is disposed to photograph a seat, followed by outputting the thus-transformed data. The transformation parameter is used to transform the data of the image such that the appearance of the seat depicted in the image is approximated to a predetermined appearance of the seat.

Moreover, learning apparatus 100 includes image processor 110 described above, and learning unit 120. Image converter 113 included in image processor 110 performs the following processing. First, converter 113 acquires both data of a correct image that indicates a first state of a seat and data of an incorrect image that indicates a second state of the seat. The correct and incorrect images are photographed with a camera. Next, converter 113 transforms both the data of the correct image and the data of the incorrect image, on the basis of the transformation parameter. Then, converter 113 outputs both the thus-transformed data of the correct image and the thus-transformed data of the incorrect image, to learning unit 120. Learning unit 120 extracts feature amounts from both the thus-transformed data of the correct image and the thus-transformed data of the incorrect image, both output from image converter 113. Then, learning unit 120 creates a learning model on the basis of the thus-extracted feature amounts.

Moreover, detection apparatus 101 includes image processor 130 described above, and detector 140. Detector 140 detects a predetermined state depicted in the image, on the basis of both a learning model and feature amounts which are extracted from transformed data that are output from converter 133 included in image processor 130.

Moreover, in a method of processing an image according to an embodiment of the present disclosure, data of an image are acquired, where the image is photographed with a camera to photograph a seat. Next, the data of the image described above is transformed, on the basis of a transformation parameter that is calculated in accordance with a camera-position at which the camera is disposed. Then, the thus-transformed data of the image are output. The transformation parameter is a parameter that is used to transform the data of the image described above such that the appearance of the seat depicted in the image is approximated to a predetermined appearance of the seat.

Moreover, a storage medium according to an embodiment of the present disclosure stores an image processing program causeing a computer to perform the following processing. That is, the processing includes 1) acquiring data of an image which is produced with a camera by photographing a seat; 2) transforming the data of the image described above, on the basis of a transformation parameter that is calculated in accordance with a camera-position at which the camera is disposed; and 3) outputting the thus-transformed data of the image. The transformation parameter is a parameter that is used to transform the data of the image described above such that the appearance of the seat depicted in the image is approximated to a predetermined appearance of the seat.

The technologies according to the present disclosure are useful for image processors, detection apparatuses, learning apparatuses, methods of processing images, and storage media which store image processing programs; they are intended to be used for learning and detecting predetermined states.

What is claimed is:

1. A learning apparatus comprising:
    an image converter configured to:
        acquire data of an image including data of a two-dimensional image depicting a first state of a seat and data of a two-dimensional image depicting a second state of the seat, the two-dimensional first state image and two-dimensional second state image being photographed with a camera;
        transform the data of the image, based on a transformation parameter which is calculated in accordance with a camera-position at which the camera is disposed, the transformation parameter being calculated for each of a plurality of camera-positions respectively; and
        output the transformed data of the image, and
    a learning unit configured to create a learning model based on a feature extracted from the transformed data of the image, wherein
    the transformation parameter is a parameter for transforming the data of the image such that an appearance of the seat depicted in the image approximates a predetermined appearance of the seat.

2. The learning apparatus according to claim 1, further comprising a transformation-parameter memory configured to store the transformation parameter,
    wherein the image converter is configured to acquire the transformation parameter from the transformation-parameter memory.

3. The learning apparatus according to claim 1, further comprising a transformation-parameter receiver configured to acquire the transformation parameter from an external memory,
    wherein the image converter is configured to acquire the transformation parameter from the transformation-parameter receiver.

4. The learning apparatus according to claim 1, wherein the transformation parameter is a parameter for transforming the data of the image such that a coordinate of a predetermined point on the seat depicted in the image matches a predetermined coordinate.

5. The learning apparatus according to claim 1, wherein the transformation parameter is a parameter for transforming the data of the image such that an inclination of a line segment defined based on predetermined points on the seat depicted in the image matches a predetermined inclination.

6. The learning apparatus according to claim 1,
    wherein the transformation parameter is calculated in accordance with at least one of an angle of the seat and a position of the seat;
    the image converter configured to select the transformation parameter based on data of the camera-position at which the camera is disposed and data of at least one of an angle of the seat and a position of the seat, the angle of the seat and the position of the seat being determined when the camera photographs the image; and
    the image converter configured to use the selected transformation parameter for transforming the data of the image.

7. The learning apparatus according to claim 1, further comprising an image memory configured to store, in advance, the data of the image, and to output the stored data of the image to the image converter.

8. The learning apparatus according to claim 1, further comprising an image receiver configured to receive the data of the image from an image memory, and to output the received data of the image to the image converter.

9. The learning apparatus according to claim 1, wherein the first state is a state of a person in the seat, and the second state is a state with no person in the seat.

10. The learning apparatus according to claim 1, wherein the learning model is based upon positions of cameras for different vehicles, the positions being stored in a memory.

11. A learning method comprising:

acquiring data of an image including both data of a two-dimensional image depicting a first state of a seat and data of a two-dimensional image depicting a second state of the seat, the two-dimensional first state image and two-dimensional second state image being photographed with a camera;

transforming the data of the image, based on a transformation parameter calculated in accordance with a camera-position at which the camera is disposed, the transformation parameter being calculated for each of a plurality of camera-positions respectively;

outputting the transformed data of the image, and creating a learning model based on a feature extracted from the transformed data of the image, wherein the transformation parameter is a parameter for transforming the data of the image such that an appearance of the seat depicted in the image approximates a predetermined appearance of the seat.

12. The learning method according to claim 11, wherein the first state is a state of a person in the seat, and the second state is a state with no person in the seat.

13. The learning method according to claim 11, the creating of the learning model is based upon positions of cameras for different vehicles, the positions being stored in a memory.

14. A nonvolatile storage medium storing a learning program causing a computer to execute:

acquiring data of an image including both data of a two-dimensional image depicting a first state of a seat and data of a two-dimensional image depicting a second state of the seat, the two-dimensional first state image and two-dimensional second state image being photographed with a camera for;

transforming the data of the image, based on a transformation parameter calculated in accordance with a camera-position at which the camera is disposed, the transformation parameter being calculated for each of a plurality of camera-positions respectively;

outputting the transformed data of the image, and creating a learning model based on a feature extracted from the transformed data of the image, wherein the transformation parameter is a parameter for transforming the data of the image such that an appearance of the seat depicted in the image approximates a predetermined appearance of the seat.

15. The non-volatile storage medium according to claim 14, wherein the first state is a state of a person in the seat and the second state is a state with no person in the seat.

16. The non-volatile storage medium according to claim 14, wherein the learning model is created based upon positions of cameras for different vehicles, the positions being stored in a memory.

* * * * *